US012705051B1

(12) United States Patent
Collins

(10) Patent No.: US 12,705,051 B1
(45) Date of Patent: Aug. 11, 2026

(54) METHOD FOR LARGE LANGUAGE MODEL SELECTION AND QUERY ROUTING VIA OFFLINE QUALITY ESTIMATION AND TOKEN-EFFICENT CONTEXT OPTIMIZATION

(71) Applicant: Aibexx Inc., Miami, FL (US)

(72) Inventor: Michael M. Collins, Miami, FL (US)

(73) Assignee: Aibexx Inc., Miami, FL (US)

( * ) Notice: Subject to any disclaimer, the term of this patent is extended or adjusted under 35 U.S.C. 154(b) by 0 days.

(21) Appl. No.: 19/350,330

(22) Filed: Oct. 6, 2025

(51) Int. Cl.
*G06F 8/77* (2018.01)
*G06F 16/2453* (2019.01)

(52) U.S. Cl.
CPC .......... *G06F 8/77* (2013.01); *G06F 16/24534* (2019.01)

(58) Field of Classification Search
CPC ............................. G06F 8/77; G06F 16/24534
See application file for complete search history.

(56) References Cited

U.S. PATENT DOCUMENTS

2025/0209271 A1* 6/2025 Imanigooghari ....... G06F 40/40
2025/0225163 A1* 7/2025 Olson .................. G06F 16/955
2025/0225373 A1* 7/2025 Lee ...................... G06N 3/0455
2025/0278578 A1* 9/2025 Chawla ................... G06F 40/40
2025/0278634 A1* 9/2025 Kumar ................... G06N 3/091
2025/0292016 A1* 9/2025 Malkemus .............. H04L 51/02
2025/0328830 A1* 10/2025 Marinovic ........... G06Q 10/063

FOREIGN PATENT DOCUMENTS

CN 116226334 A * 6/2023 ......... G06F 16/3344
CN 120234402 A * 7/2025 ............. G06N 3/045
CN 120409674 A * 8/2025 ........... G06F 18/253

* cited by examiner

*Primary Examiner* — Daxin Wu
(74) *Attorney, Agent, or Firm* — Run8 Patent Group, LLC; Peter Miller; Brian T. Chew

(57) ABSTRACT

A method includes: accessing a user query; and accessing a quality prediction model that predicts quality scores of responses from a set of language models according to queries. The method also includes, for each language model in the set of language models, calculating a predicted quality score, in a set of predicted quality scores, of a projected response by the language model based on the user query and the quality prediction model; and calculating a resource estimate, in a set of resource estimates, for the projected response by the language model. The method further includes: selecting a target language model, in the set of language models, for the user query based on the set of predicted quality scores and the set of resource estimates; and invoking the target language model to generate a response for the user query.

19 Claims, 4 Drawing Sheets

METHOD FOR LARGE LANGUAGE MODEL SELECTION AND QUERY ROUTING VIA OFFLINE QUALITY ESTIMATION AND TOKEN-EFFICENT CONTEXT OPTIMIZATION

TECHNICAL FIELD

This invention relates generally to the field of agentic software development and, more specifically, to a new and useful method for large language model selection and query routing via offline quality estimation and token-efficient context optimization within the field of agentic software development.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
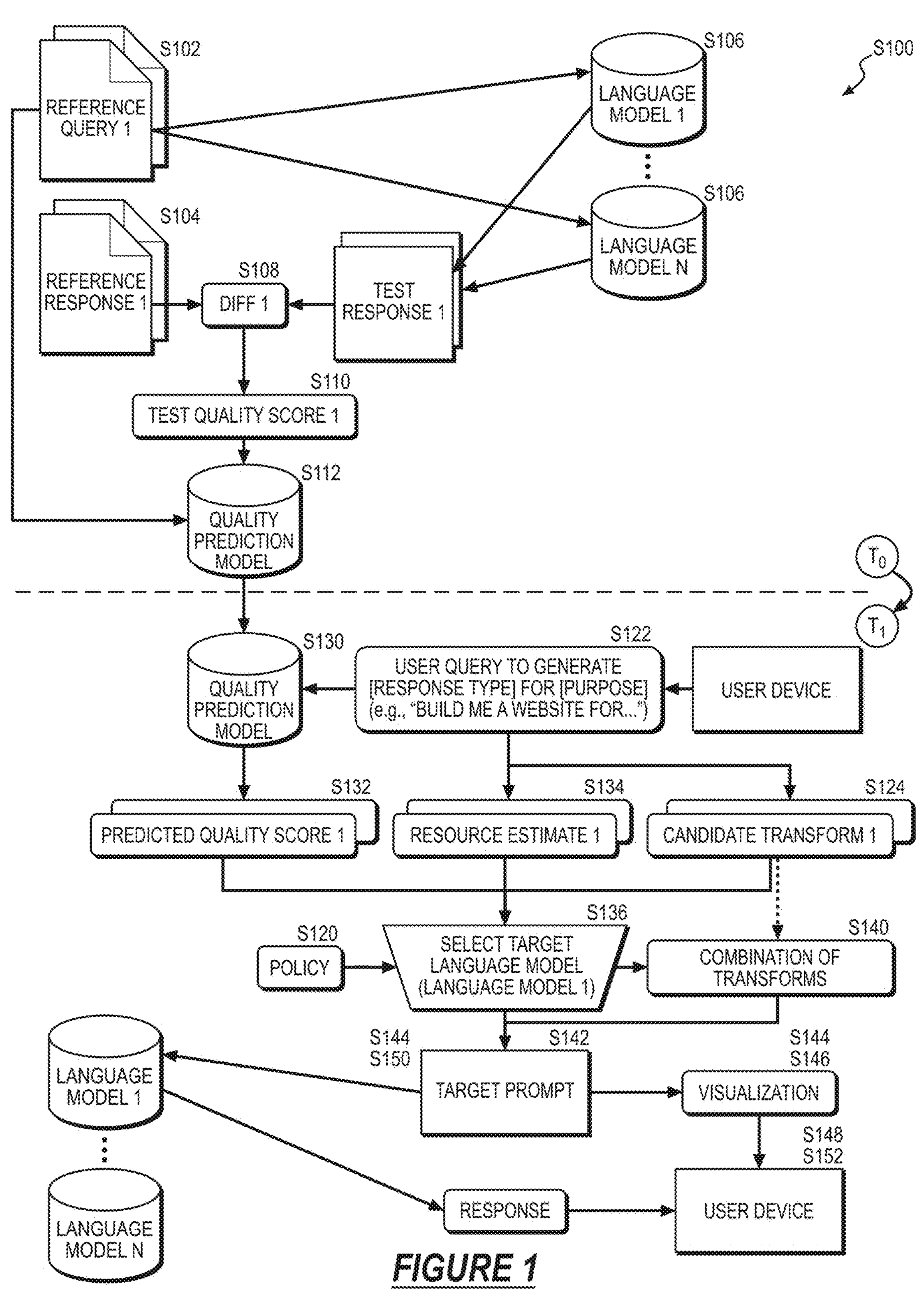
FIG. 1 is a flowchart representation of a method.
Figure 3:
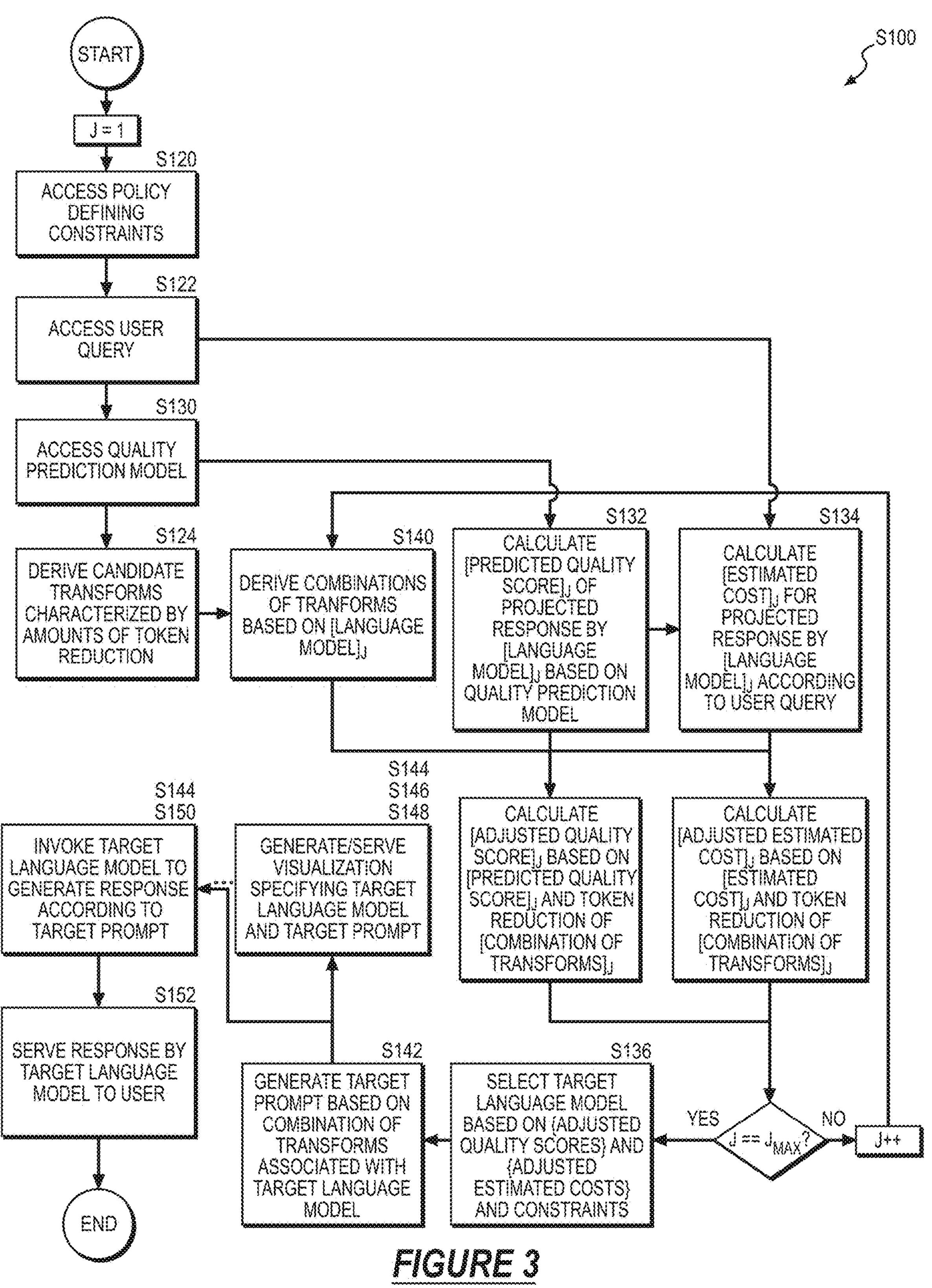
FIG. 3 is a flowchart representation of one variation of the method.

As shown in FIGS. 1 and 3, a method S100 includes: accessing a user query characterized by an initial quantity of tokens in Block S122; deriving a set of candidate transforms for the user query in Block S124; and accessing a quality prediction model that predicts quality scores of responses from a set of language models according to queries in Block S130. Each candidate transform in the set of candidate transforms is characterized by an amount of token reduction to the initial quantity of tokens.

The method S100 also includes, for each language model in the set of language models: calculating a predicted quality score, in a set of predicted quality scores, of a projected response by the language model based on the user query and the quality prediction model in Block S132; and calculating a resource estimate, in a set of resource estimates, for the projected response by the language model in Block S134.

The method S100 further includes, in Block S136, selecting a target language model, in the set of language models, for the user query based on: the set of predicted quality scores; the set of resource estimates; and amounts of token reduction characterizing the set of candidate transforms.

The method 100 also includes: deriving a target combination of transforms in the set of candidate transforms based on the target language model in Block S140; generating a target prompt based on the user query and the target combination of transforms in Block S142; and generating an output specifying the target language model and the target prompt in Block S144. The target prompt is characterized by a final quantity of tokens falling below the initial quantity of tokens.

1.1 Variation: Quality Prediction Model Training+Visualization

Figure 2:
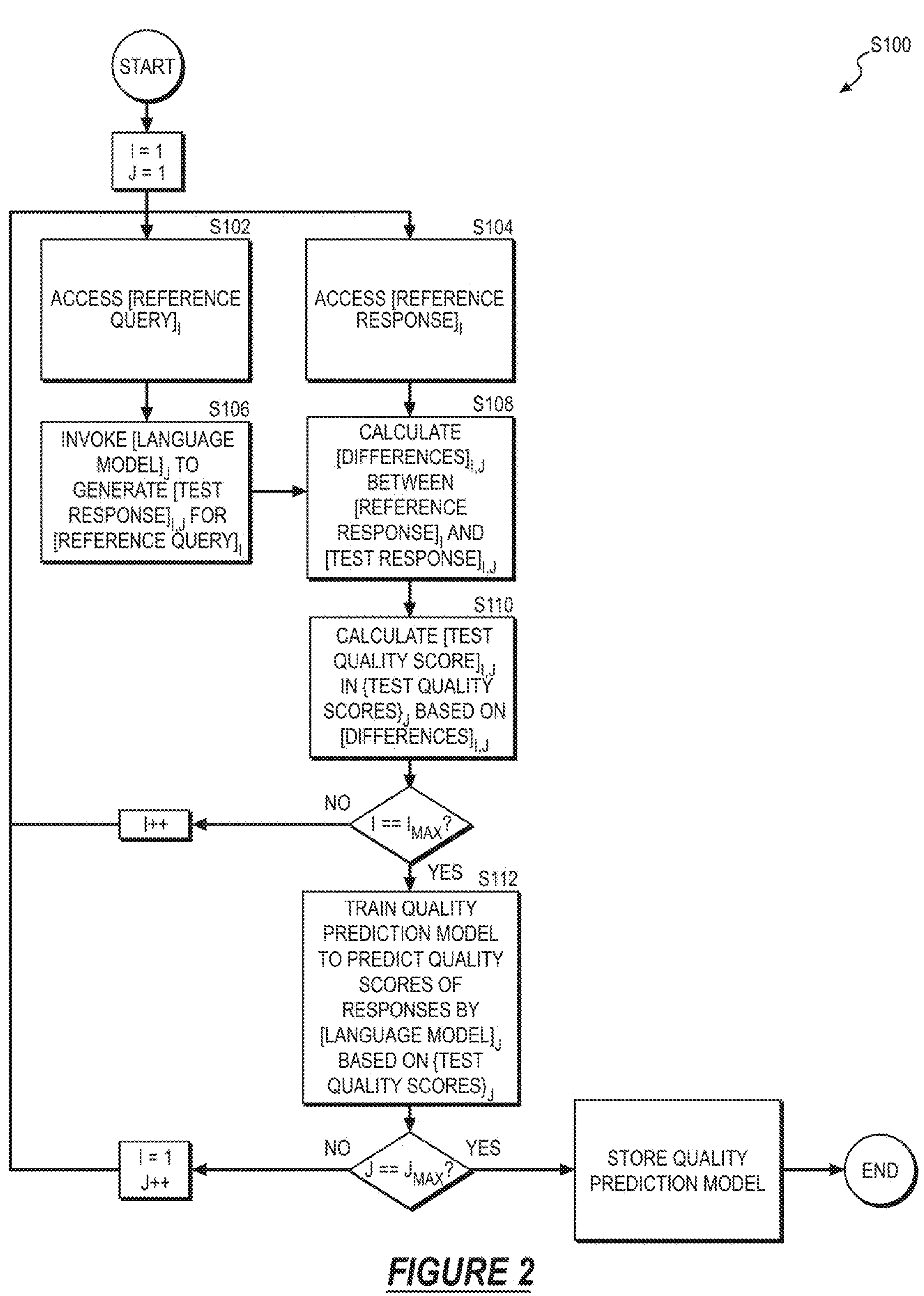
FIG. 2 is a flowchart representation of one variation of the method.

As shown in FIGS. 1, 2, and 3, one variation of the method S100 includes: accessing a set of reference queries representing software development tasks in Block S102; and accessing a set of reference responses corresponding to the set of reference queries in Block S104.

This variation of the method S100 also includes, for each language model in the set of language models and for each reference query in the set of reference queries: invoking the language model to generate a test response based on the reference query in Block S106; calculating a set of differences between the test response and a reference response, in the set of reference responses, corresponding to the reference query in Block S108; and calculating a test quality score, in a set of test quality scores for the language model, based on the set of differences in Block S110.

This variation of the method S100 further includes, for each language model in the set of language models, training a quality prediction model to predict quality scores of projected responses by the language model according to queries based on the set of reference queries and the set of test quality scores in Block S112.

This variation of the method S100 also includes accessing a user query representing a software development task in Block S122.

This variation of the method S100 further includes, for each language model in the set of language models: calculating a predicted quality score, in a set of predicted quality scores, of a projected response by the language model based on the user query and the quality prediction model in Block S132; and calculating a resource estimate, in a set of resource estimates, for the projected response by the language model in Block S134.

This variation of the method S100 also includes: selecting a target language model, in the set of language models, for the user query based on the set of predicted quality scores and the set of resource estimates in Block S136; generating a visualization in Block S146; and serving the visualization to a user in Block S148. The visualization specifies: an identifier of the target language model; a predicted quality score, in the set of predicted quality scores, associated with the target language model; and a resource estimate, in the set of resource estimates, associated with the target language model.

1.2 Variation: Language Model Selection Based on Target Prompts

Figure 4:
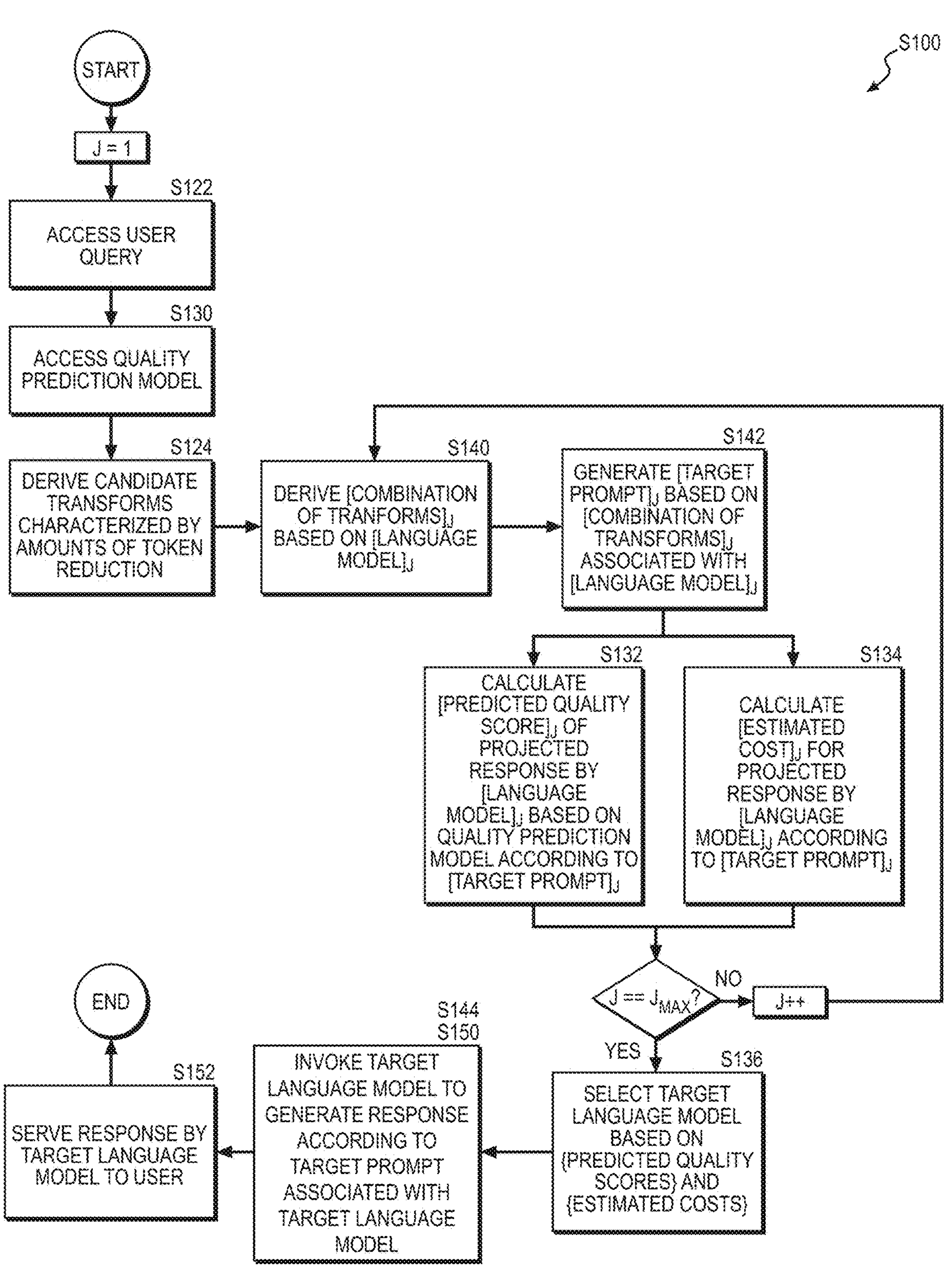
FIG. 4 is a flowchart representation of one variation of the method.

As shown in FIGS. 1 and 4, one variation of the method S100 includes: accessing a user query characterized by an initial quantity of tokens in Block S122; deriving a set of candidate transforms for the user query in Block S124; and accessing a quality prediction model that predicts quality scores of projected responses by a set of language models according to queries in Block S130. Each candidate transform in the set of candidate transforms is characterized by an amount of token reduction to the initial quantity of tokens.

This variation of the method S100 also includes, for each language model in the set of language models: deriving a combination of transforms in the set of candidate transforms based on the language model in Block S140; generating a target prompt in a set of target prompts based on the user query and the combination of transforms, the target prompt characterized by a final quantity of tokens falling below the initial quality of tokens in Block S142; calculating a predicted quality score, in a set of predicted quality scores, of a projected response by the language model based on the target prompt and the quality prediction model in Block S132; and calculating a resource estimate, in a set of resource estimates, for the projected response by the language model based on the final quantity of tokens in the target prompt and an estimated quantity of tokens in the projected response in Block S134.

This variation of the method S100 further includes: selecting a target language model, in the set of language models, for the user query based on the set of predicted quality scores and the set of resource estimates in Block S136; invoking the target language model to generate a response for the user query according to a target prompt, in the set of target prompts, associated with the target language model in Block S150; and serving the response to a user in Block S152.

2. Applications

Generally, a computer system (hereinafter "the system") can execute Blocks of the method S100: to access a set of reference queries (e.g., "build me a website for . . . ") representing various types of software development (e.g., code generation) tasks; to access a set of reference responses (or "golden standard" responses) for the set of reference queries; to invoke a set of language models (e.g., large language models, multimodal models, generative pre-trained transformers) to generate a set of test responses according to the set of reference queries; to calculate a set of quality scores for the set of test responses based on differences between the set of test responses and the set of reference responses; and to train a quality prediction model to predict quality scores—for projected responses from the set of language models according to new user queries—based on the set of reference queries and the set of quality scores.

Accordingly, the system can execute Blocks of the method S100: to characterize quality of the test responses—representing program code for various types of software development tasks—generated by the language models according to the reference queries; and to train the quality prediction model to predict quality of a projected response from each language model according to a new query representing a new software development task.

Therefore, rather than invoking every language model for a new query to empirically identify a model-generated response characterized by highest quality, the system can execute Blocks of the method S100: to predict quality of a projected response from each language model according to the new query based on the quality prediction model; to select a target language model predicted to generate a response characterized by highest (or relatively high) quality—indicative of greatest suitability among the set of language models—for the new query; and to selectively (e.g., exclusively) invoke the target language model for the new query, thereby increasing effectiveness of the new query while reducing total resource allocation (e.g., computational resources, power utilization, communication overhead, monetary cost) attributed to the new query.

2.1 Query Transforms

Additionally, the system can execute Blocks of the method S100: to access a user query characterized by an initial quantity of tokens; to detect language signals (e.g., words, phrases, syntax, diction, markings) in the user query; to derive candidate transforms—applicable to language signals in the user query, such as replacement of a word characterized by three tokens with a semantically similar word characterized by one token—that reduce the initial quantity of tokens in the user query; and to characterize amounts of token reduction for the candidate transforms.

Furthermore, the system can execute Blocks of the method S100: to access a set of constraints (e.g., a threshold quality score, a threshold cost) for the user query; to calculate a set of predicted quality scores of projected responses by the set of language models according to the user query based on the quality prediction model; to calculate a set of resource estimates (e.g., estimated costs) for the projected responses by the set of language models; and to select a target language model—associated with a projected response that conforms to the set of constraints—for the user query based on the set of predicted quality scores, the set of resource estimates, and the amounts of token reduction for the candidate transforms.

Accordingly, the system can: predict quality of a projected response from each language model based on the quality prediction model according to context of (e.g., a type of task specified in) the user query; calculate a resource estimate (e.g., an estimated cost, an estimated response time) attributed to the user query for each language model; and adaptively select a target language model predicted to generate a response characterized by highest (or relatively high) quality—and/or minimum (or relatively minimal) resource allocation (e.g., lowest cost, relatively low cost)—for the new query according to the set of constraints, thereby increasing effectiveness of an individual query while enabling a user to manage resource allocations attributed to the individual query or a set of queries.

Therefore, the system can later apply the set (or a subset) of candidate transforms to language signals in the user query to in order to yield a target prompt—characterized by a final quantity of tokens falling below the initial quantity of tokens in the user query—for submission to the target language model, thereby reducing a token count (e.g., by 30-40%) of the user query, reducing total resource allocation (e.g., reducing cost by 40-60%, reducing computational load, reducing power consumption) attributed to the user query, and/or simplifying the user query in order to potentially improve accuracy (e.g., increasing quality by 1-3%) of a response generated according to the target prompt.

2.3 Variation: Other Request Types

As described herein, the system executes the method S100: to characterize quality of test responses—representing program code for various types of software development tasks—generated by language models according to reference queries; to train the quality prediction model to predict quality of a projected response from each language model according to a new query representing a new software development task; to predict quality of a projected response from each language model based on the quality prediction model according to context of (e.g., a type of task specified in) the new user query; to select a target language model predicted to generate a response characterized by highest (or relatively high) quality for the new user query; and to invoke the target language model for the new query.

However, the system can similarly execute Blocks of the method S100: to characterize quality of test responses—for other types of user requests or tasks (e.g., information retrieval, summarization, creative generation, conversational chatbot, data transformation, reasoning, problem-solving, decision support)—generated by language models according to reference queries; to train the quality prediction model to predict quality of a projected response from each language model according to a new query; to predict quality of a projected response from each language model based on the quality prediction model according to context of (e.g., a type of task specified in) the new user query; to select a target language model predicted to generate a response characterized by highest (or relatively high) quality for the new user query; and to invoke the target language model for the new query.

2.4 Variation: Standalone Query Transformation

As described herein, the system executes the method S100: to access a user query characterized by an initial quantity of tokens; to derive candidate transforms that reduce the initial quantity of tokens in the user query; to characterize amounts of token reduction for the candidate transforms; to calculate a set of predicted quality scores of projected responses by the set of language models according to the user query based on the quality prediction model; to calculate a set of resource estimates (e.g., estimated costs) for the projected responses by the set of language models; to select a target language model for the user query based on the set of predicted quality scores, the set of resource estimates, and the amounts of token reduction for the candidate transforms; and to generate a target prompt based on the user query and the set (or a subset) of candidate transforms in response to selection of the target language model.

However, the system can similarly execute Blocks of the method S100: to access a user query characterized by an initial quantity of tokens, such as via an application programming interface; to derive candidate transforms that reduce the initial quantity of tokens in the user query; to apply the set (or a subset) of candidate transforms to the user query to in order to yield a target prompt—characterized by a final quantity of tokens falling below the initial quantity of tokens in the user query—for submission to a target language model; and to return the target prompt to a user (e.g., a human user, a computer process), such as via the application programming interface, thereby reducing computational load, power consumption, and/or monetary cost attributed to the user query. Additionally or alternatively, the system can execute Blocks of the method S100: to invoke the target language model to generate a response according to the target prompt; and to return the response to the user.

3. Quality Prediction Model

The method S100 includes: accessing a set of reference queries representing software development tasks in Block S102; and accessing a set of reference responses corresponding to the set of reference queries in Block S104.

The method S100 includes, for each language model in the set of language models and for each reference query in the set of reference queries: invoking the language model to generate a test response based on the reference query in Block S106; calculating a set of differences between the test response and a reference response, in the set of reference responses, corresponding to the reference query in Block S108; and calculating a test quality score, in a set of test quality scores for the language model, based on the set of differences in Block S110.

Block S112 of the method S100 recites, for each language model in the set of language models, based on the set of reference queries and the set of test quality scores, training a quality prediction model to predict quality scores of projected responses by the language model according to queries.

Generally, in Blocks S102, S104, S106, S108, S110, and S112, the system: accesses a set of reference queries; accesses a set of reference responses (or "golden standard" responses) for the set of reference queries; invokes the set of language models to generate a set of test responses according to the set of reference queries; calculates a set of quality scores for the set of test responses based on differences between the set of test responses and the set of reference responses; and trains a quality prediction model to predict quality scores—for projected responses from the set of language models according to new queries—based on the set of reference queries and the set of quality scores.

More specifically, the system can: access a set of reference queries representing diverse software development tasks; and access a set of reference responses—corresponding to the set of reference queries—representing program code that resolves these diverse software development tasks.

For each language model in the set of language models and for each reference query in the set of reference queries, the system can: invoke the language model to generate a test response—representing program code associated with a software development task—based on the reference query; calculate a set of differences between the test response and a reference response, in the set of reference responses, corresponding to the reference query; and calculate a test quality score, in a set of test quality scores for the language model, based on the set of differences.

The system can then train the quality prediction model to predict quality scores of projected responses by the set of language models according to queries based on the set of reference queries and sets of test quality scores.

Accordingly, the system can: characterize quality of test responses—representing program code for various types of software development tasks—from the language models; and train the quality prediction model to predict quality of a projected response from each language model based on a new query representing a new software development task.

Therefore, rather than invoking every language model for a new query to empirically identify a response characterized by highest quality, the system can: predict quality of a projected response from each language model based on the quality prediction model; select a target language model predicted to generate a response characterized by highest (or relatively high) quality for the new query; and selectively (e.g., exclusively) invoke the target language model for the new query, thereby reducing total resource allocation (e.g., computational resources, power utilization, communication overhead, monetary cost) attributed to the new query.

3.1 Reference Queries+Reference Responses

In one implementation, the system: accesses a set of reference queries representing software development tasks characterized by a set of task types in Block S102; and accesses a set of reference responses corresponding to the set of reference queries in Block S104.

In one example, the system: accesses a first reference query representing a first software development task (e.g., "build me a website for music production services") characterized by a first task type; and accesses a first reference response—corresponding to the first reference query—including a first set of reference program code (e.g., Hypertext Markup Language code, JavaScript code) that resolves the first software development task.

More specifically, the system can access the first reference response including the first set of reference program code: characterized by a reference quantity of tokens (e.g., 8,000 tokens); and representing a reference website for music production services. The reference website includes: a header including links to additional pages; a body including text, images, and audio recordings; and a contact form.

In another example, the system: accesses a first reference query representing a first software development task (e.g., "add a button that launches a contact form on the website") characterized by a second task type; and accesses a second reference response—corresponding to the second reference query—including a second set of reference program code that resolves the second software development task.

3.2 Test Quality Scores: First Language Model

In one implementation, for a first language model in the set of language models, the system: invokes the first language model to generate a first test response based on the first reference query in Block S106; calculates a first set of differences between the first test response and the first reference response in Block S108; and calculates a first test quality score, in a first set of test quality scores for the first language model, based on the first set of differences in Block S110.

For example, the system can invoke the first language model to generate a first test response based on the first reference query representing the first software development task (e.g., "build me a website for music production services"). The first test response includes a first set of program code: characterized by a first quantity of tokens (e.g., 9,000 tokens); and representing a first website for music production services. The first website includes: a header including links to additional pages; a body including text; and a contact form.

In this example, the system: calculates a first set of differences (e.g., absence of images and audio recordings in the body of the first website) between the first set of program code in the first test response and the set of reference program code in the first reference response; and calculates a first test quality score (e.g., "8.7") based on the first set of differences.

More specifically, the system can: calculate a difference between the reference quantity of tokens and the first quantity of tokens; and calculate the first test quality score based on the difference.

Additionally or alternatively, the system can calculate the first test quality score based on a confidence that the first set of program code resolves the first software development task.

Accordingly, the system can characterize quality of the first set of program code—generated by the first language model based on the first reference query—relative to the set of reference program code in the first reference response and/or based on other criteria, such as token length, functionality of the first set of program code, relevance to the first reference query, etc.

The system repeats the foregoing methods and techniques for each reference query in the set of reference queries: to invoke the first language model to generate a test response based on the reference query; to calculate a set of differences between the test response and a reference response—corresponding to the reference query—in the set of reference responses; and to calculate a test quality score, in the first set of test quality scores for the first language model, based on the set of differences.

3.2.1 Test Quality Scores: Second Language Model

In another implementation, the system repeats the foregoing methods and techniques for a second language model in the set of language models: to invoke the second language model to generate a second test response based on the first reference query; to calculate a second set of differences between the first test response and the first reference response; and to calculate a second test quality score, in a second set of test quality scores for the second language model, based on the second set of differences.

For example, the system can invoke the second language model to generate a second test response based on the first reference query representing the first software development task (e.g., "build me a website for music production services"). The second test response includes a second set of program code: characterized by a second quantity of tokens (e.g., 14,000 tokens); and representing a second website for music production services. The second website includes: a body including text; and a contact form.

In this example, the system: calculates a second set of differences (e.g., absence of a header, absence of images and audio recordings in the body of the first website) between the second set of program code in the second test response and the set of reference program code in the first reference response; and calculates a second test quality score (e.g., "7.8") based on the second set of differences.

The system repeats the foregoing methods and techniques for each reference query in the set of reference queries: to invoke the second language model to generate a test response based on the reference query; to calculate a set of differences between the test response and a reference response—corresponding to the reference query—in the set of reference responses; and to calculate a test quality score, in the second set of test quality scores for the second language model, based on the set of differences.

3.2.2 Test Quality Scores: Other Language Models

The system repeats the foregoing methods and techniques for each language model in the set of language models and for each reference query in the set of reference queries: to invoke the language model to generate a test response based on the reference query; to calculate a set of differences between the test response and a reference response—corresponding to the reference query—in the set of reference responses; and to calculate a test quality score, in the second set of test quality scores for the language model, based on the set of differences.

3.3 Quality Prediction Model Training

Generally, in Block S112, the system trains the quality prediction model to predict quality scores of projected responses by the set of language models according to queries based on the set of reference queries and sets of test quality scores.

In one implementation, the system: accesses the set of reference queries; accesses the first set of test quality scores for the first language model; and trains the quality prediction model to predict quality scores of responses by the first language model according to queries based on the set of reference queries and the first set of test quality scores.

For example, the system can implement artificial intelligence, machine learning, reinforcement learning, regression, and/or other techniques to train the quality prediction model to predict quality scores of responses by the first language model according to an input query.

The system repeats the foregoing methods and techniques for each language model in the set of language models: to access the set of reference queries; to access a set of test quality scores for the language model; and to train the quality prediction model to predict quality scores of responses by the language model according to queries based on the set of reference queries and the set of test quality scores.

For example, the system can: access the set of reference queries; access the second set of test quality scores for the second language model; and train the quality prediction model to predict quality scores of responses by the second language model according to queries based on the set of reference queries and the second set of test quality scores.

In another implementation, the system stores the quality prediction model external to the set of language models and/or in local storage (or "offline").

Therefore, rather than invoking every language model for a new query to empirically identify a response characterized by highest quality, the system can: predict quality of a projected response from each language model based on the quality prediction model; select a target language model predicted to generate a response characterized by highest (or relatively high) quality for the new query; and selectively (e.g., exclusively) invoke the target language model for the new query, thereby reducing total resource allocation (e.g., computational resources, power utilization, communication overhead, response time, monetary cost) attributed to the new query.

4. User Query

Block S122 of the method S100 recites accessing a user query characterized by an initial quantity of tokens.

In one implementation, in Block S122, the system accesses a user query, such as from a user (e.g., a human, a process) at a user device via an interface (e.g., a user interface, a programmatic interface).

For example, the system can receive (or intercept) the user query: representing a software development task (e.g., "I want a website for my music recording studio . . . "); and characterized by an initial quantity of tokens (e.g., 16,000 tokens).

5. Transforms

Block S124 of the method S100 recites deriving a set of candidate transforms for the user query.

Generally, in Block S124, the system can derive candidate transforms—for the user query—that reduce the initial quantity of tokens in the user query.

In one implementation, the system: accesses the user query characterized by the initial quantity of tokens (e.g., 16,000 tokens); detects a first set of language signals (e.g., words, numbers, phrases, syntax, diction, markings) in the user query; and derives a set of transforms—for language signals in the first set of language signals—that reduce the initial quantity of tokens in the user query. Each transform in the set of transforms is characterized by an amount of token reduction (e.g., a quantity of tokens by which the initial quantity of tokens is reduced according to the transform).

In one example, the system: detects a first subset of language signals (e.g., a first word "grandiose"), in the first set of language signals, characterized by a first quantity of tokens (e.g., two tokens); and, based on semantic alignment between the first subset of language signals and a second subset of language signals (e.g., a second word "big"), derives a first candidate transform for the first subset of language signals that yields the second subset of language signals (e.g., replacement of the first word "grandiose" with the second word "big"). The second subset of language signals is characterized by a second quantity of tokens (e.g., one token) falling below the first quantity of tokens.

More specifically, the system can access a group of language signals including: the first subset of language signals; and language signals—proximal the first subset of language signals—in the first set of language signals. The system can then: calculate a first context score (e.g., 93%)—representing semantic alignment between the first subset of language signals and the second subset of language signals—based on the group of language signals; and, in response to detecting the first context score exceeding a context score threshold (e.g., 90%), derive the first candidate transform for the first subset of language signals that yields the second subset of language signals. Alternatively, in response to detecting the first context score falling below the context score threshold, the system can discard the first candidate transform for the first subset of language signals that yields the second subset of language signals.

In this example, the system can calculate a first amount of token reduction—corresponding to a difference between the first quantity of tokens and the second quantity of tokens—for the first candidate transform.

Additionally or alternatively, the system can: calculate a first quality impact score (e.g., 1%) representing reduction of predicted quality of the projected response based on replacement of the first subset of language signals with the second subset of language signals; and, in response to detecting the first quality impact score falling below a threshold quality impact score (e.g., 2%), derive the first candidate transform for the first subset of language signals that yields the second subset of language signals. Alternatively, in response to detecting the first quality impact score exceeding the threshold quality impact score, the system can discard the first candidate transform for the first subset of language signals that yields the second subset of language signals.

In another example, the system: detects a third subset of language signals (e.g., a first phrase "I want a website for my music recording studio"), in the first set of language signals, characterized by a third quantity of tokens (e.g., ten tokens); and, based on semantic alignment between the third subset of language signals and a fourth subset of language signals (e.g., a second phrase "website for music recording studio"), derives a second candidate transform for the third subset of language signals that yields the fourth subset of language signals (e.g., replacement of the first phrase with the second phrase). The fourth subset of language signals is characterized by a fourth quantity of tokens (e.g., six tokens) falling below the third quantity of tokens.

In this example, the system can calculate a second amount of token reduction—corresponding to a difference between the third quantity of tokens and the fourth quantity of tokens—for the second candidate transform.

The system repeats the foregoing methods and techniques for other (initial) subsets of language signals in the user query: to detect an initial subset of language signals (e.g., a word, a phrase), in the first set of language signals, characterized by a preceding quantity of tokens; and, based on semantic alignment between the initial subset of language signals and an alternative subset of language signals, to derive a candidate transform, in the set of candidate transforms, for the initial subset of language signals that yields the alternative subset of language signals characterized by a succeeding quantity of tokens falling below the preceding quantity of tokens.

Additionally, for each candidate transform in the set of candidate transforms, the system can: calculate an amount of token reduction associated with the candidate transform; and a quality impact score associated with the candidate transform.

Therefore, the system can later apply the set (or a subset) of candidate transforms to the first set of language signals in the user query in order to yield a second set of language signals of a target prompt—characterized by a final quantity of tokens falling below the initial quantity of tokens in the user query—for submission to a target language model, thereby reducing a token count of the user query, reducing total resource allocation attributed to the user query, and/or simplifying the user query in order to potentially improve accuracy of a response generated according to the target prompt.

6. Language Model Selection

Block S130 of the method S100 recites accessing a quality prediction model that predicts quality scores of responses from a set of language models according to queries.

The method S100 includes, for each language model in the set of language models: calculating a predicted quality score, in a set of predicted quality scores, of a projected response by the language model based on the user query and the quality prediction model in Block S132; and calculating a resource estimate, in a set of resource estimates, for the projected response by the language model in Block S134.

Block S136 of the method S100 recites selecting a target language model, in the set of language models, for the user query based on: the set of predicted quality scores; the set of resource estimates; and amounts of token reduction characterizing the set of candidate transforms.

Generally, in Blocks S130, S132, S134, and S136, the system can: access the quality prediction model (e.g., external to the set of language models, stored in local storage (or "offline")); calculate a set of predicted quality scores of projected responses by the set of language models according to the user query based on the quality prediction model; calculate a set of resource estimates for the projected responses by the set of language models; and select a target language model, in the set of language models, for the user query based on the set of predicted quality scores and/or the set of resource estimates.

More specifically, the system can access a set of constraints (e.g., a target quality score, a target estimated cost, a threshold quality score, a threshold cost) for the user query. For each language model in the set of language models, the system can: calculate a predicted quality score, in the set of predicted quality scores, of a projected response by the language model based on the user query and the quality prediction model; and calculate a resource estimate, in the set of resource estimates, for the projected response by the language model. The system can then select the target language model—associated with a projected response that conforms to the set of constraints—for the user query based on the set of predicted quality scores and the set of resource estimates.

Therefore, the system can: predict quality of a projected response from each language model based on the quality prediction model according to context of (e.g., a type of task specified in) the user query; calculate a resource estimate (e.g., an estimated cost, an estimated response time) attributed to the user query for each language model; and adaptively select a target language model predicted to generate a response characterized by highest (or relatively high) quality—and/or minimum (or relatively minimal) resource allocation (e.g., lowest cost, relatively low cost, shortest response time, relatively short response time)—for the new query according to the set of constraints, thereby increasing effectiveness of an individual query while enabling a user to manage resource allocations attributed to the individual query or a set of queries.

6.1 Predicted Quality Scores: First Language Model

In one implementation, the system: accesses the quality prediction model that predicts quality scores of responses from a set of language models according to queries in Block S130; and calculates a first predicted quality score (e.g., "9.1"), in a set of predicted quality scores, of a first projected response by the first language model based on the user query and the quality prediction model in Block S132.

6.2 Resource Estimate: First Language Model

In another implementation, in Block S134, the system calculates a first resource estimate (e.g., estimated cost, estimated response time), in a set of resource estimates, for the first projected response by the first language model.

More specifically, the system can calculate a first estimated cost, in a set of estimated costs, for the first projected response by the first language model.

For example, the system can: access a first input token cost (e.g., "$0.03 per 1,000 tokens")—representing a cost per input token—for the first language model; access a first output token cost (e.g., "$0.06 per 1,000 tokens"), representing a cost per output token, for the first language model; calculate an initial quantity of input tokens (e.g., 16,000) in the user query; calculate a first estimated quantity of output tokens (e.g., 10,000) in the first projected response; calculate a first estimated subtotal (e.g., "$0.48") based on a product of the initial quantity of input tokens and the first input token cost; calculate a second estimated subtotal (e.g., "$0.60") based on a product of the first estimated quantity of output tokens and the first output token cost; and calculate the first estimated cost (e.g., "$1.08") based on a sum of the first estimated subtotal and the second estimated subtotal.

Additionally, the system can calculate a first estimated response time, in a set of estimated response times, for the first projected response by the first language model.

For example, the system can calculate the first estimated response time (e.g., 36 minutes) for the first projected response by the first language model based on the user query, the quality prediction model, and/or historical response times for historical queries corresponding (e.g., semantically similar) to the user query.

6.4 Other Language Models

The system repeats the foregoing methods and techniques for each language model in the set of language models: to calculate a predicted quality score, in the set of predicted quality scores, of a projected response by the language model based on the user query and the quality prediction model; and to calculate a resource estimate, in the set of resource estimates, for the projected response by the language model.

For example, the system can: calculate a second predicted quality score (e.g., "7.9"), in the set of predicted quality scores, of a second projected response by the second language model in the set of language models based on the user query and the quality prediction model; calculate a second estimated cost (e.g., $0.98), in the set of estimated costs, for the second projected response by the second language model; and calculate a second estimated response time (e.g., 36 minutes), in the set of estimated response times, for the second projected response by the second language model.

6.5 Combinations of Transforms+Effects

Generally, in Block S140, the system can derive combinations of transforms, in the set of candidate transforms, compatible with the set of language models.

In one implementation, the system derives a first combination of transforms, in the set of candidate transforms, compatible with the first language model.

More specifically, the system can: access a set of constraints defining a threshold cost (e.g., "$1.00") for the user query and/or a threshold quality score (e.g., "8.5"); and access the set of candidate transforms. Each candidate transform in the set of candidate transforms is characterized by: an amount of token reduction; and a quality impact score. Based on amounts of token reduction and quality impact scores of a candidate transform in the set of candidate transforms, the system can derive a first permutation of transforms—representing an ordered subset of transforms in the set of candidate transforms—compatible with the first language model and conforming to the set of constraints based on a predicted quality score and an estimated cost associated with the language model for the user query.

For example, the system can: access the first estimated cost (e.g., "$1.08") for the first projected response by the first language model; and access the first predicted quality score (e.g., "9.1") of the first projected response by the first language model.

Additionally, the system can: derive the first permutation of transforms characterized by a first aggregate amount of token reduction (e.g., 4,000 tokens) based on amounts of token reduction associated with candidate transforms in the first permutation of transforms; calculate a first cost reduction value (e.g., $0.12) based on the first aggregate amount of token reduction and the first input token cost (e.g., $0.03 per 1,000 tokens); and calculate a first adjusted estimated cost associated with the first language model based on the first estimated cost for the first projected response by the first language model and the first cost reduction value. The first adjusted estimated cost falls below the threshold cost for the user query.

In this example, the system can: derive the first permutation of transforms characterized by a first aggregate quality impact score (e.g., "4%") based on quality impact scores associated with candidate transforms in the first permutation of transforms; and calculate a first adjusted quality score (e.g., "8.74") based on the first predicted quality score of the first projected response by the first language model and the first aggregate quality impact score. The first adjusted quality score exceeds the threshold quality score.

Therefore, the system can derive (or identify) the first permutation of transforms that, when executed on (or applied to) the user query, reduces the first estimated cost attributed to the user query to fall below the threshold cost while preventing the first predicted quality score from falling below the threshold quality score.

The system repeats the foregoing methods and techniques for each language model in the set of language models to derive a combination (or permutation) of transforms, in the set of candidate transforms, compatible with the language model and conforming to the set of constraints.

6.6 Language Model Selection

Generally, in Block S136, the system can select the target language model, in the set of language models, based on: the set of predicted quality scores; the set of resource estimates; and/or amounts of token reduction characterizing the set of candidate transforms.

More specifically, the system can select the target language model based on: the set of predicted quality scores; the set of estimated costs; the set of estimated response times; amounts of token reduction characterizing candidate transactions in the set of candidate transforms; and/or quality impact scores characterizing candidate transactions in the set of candidate transforms.

In one implementation, in Block S120, the system accesses a set of constraints (e.g., a policy)—for the user query (or a set of user queries)—defining: a threshold quality score; a threshold cost(s); and/or a threshold response time.

For example, the system can access the threshold cost(s) representing a threshold cost per query and/or a threshold cost for user queries during a target time interval (e.g., a monthly budget for queries).

In this implementation, in Block S136, the system selects the target language model based on: the set of predicted quality scores; the set of estimated costs; the set of estimated response times; amounts of token reduction characterizing the set of candidate transforms; quality impact scores characterizing candidate transactions in the set of candidate transforms; and the set of constraints. The target language model is associated with: a predicted quality score (or an adjusted quality score), in the set of predicted quality scores, exceeding the threshold quality score; an estimated cost (or an adjusted estimated cost), in the set of estimated costs, falling below the threshold cost; and an estimated response time, in the set of estimated response times, falling below the threshold response time.

Therefore, the system can select the target language model—associated with a projected response that conforms to the set of constraints defined in the policy—for the user query based on the set of predicted quality scores, the set of estimated costs, and the set of estimated response times.

6.6.1 Aggregate Score

Generally, for each language model in the set of language models, the system can calculate an aggregate score, in a set of aggregate scores, of the language model based on: a predicted quality score, in the set of predicted quality scores, of the projected response by the language model; and a resource estimate, in the set of resource estimates, for the projected response by the language model.

In one implementation, for each language model in the set of language models, the system: accesses a predicted quality score, in the set of predicted quality scores, (and/or an adjusted quality score) of the projected response by the language model; accesses an estimated cost, in the set of estimated costs, (and/or an adjusted estimated cost) for the projected response by the language model; and accesses an estimated response time, in the set of estimated response times, for the projected response by the language model.

In this implementation, for each language model in the set of language models, the system calculates an aggregate score, in a set of aggregate scores, of the language model based on: the predicted quality score (and/or the adjusted quality score) of the projected response by the language model; the estimated cost (and/or the adjusted estimated cost) for the projected response by the language model; and the estimated response time for the projected response by the language model.

For example, for each language model in the set of language models, the system can: calculate a cost score based on (e.g., inversely proportional to) the estimated cost (and/or the adjusted estimated cost) for the projected response by the language model; and calculate a response time score based on (e.g., inversely proportional to) the estimated response time for the projected response by the language model.

In this example, the system can calculate the aggregate score, in the set of aggregate scores, for the language model based on: the predicted quality score (and/or the adjusted quality score) of the projected response by the language model; the cost score; and the response time score.

In this implementation, the system selects the target language model, in the set of language models, characterized by a greatest aggregate score in the set of aggregate scores.

6.6.2 Objective Function

In another implementation, the system accesses an objective function (e.g., defined in the policy) representing: a first weight for predicted quality scores in the set of predicted quality scores; a second weight for estimated costs in the set of estimated costs; and a third weight for estimated response times in the set of estimated response times.

In this implementation, the system selects the target language model, in the set of language models, for the user query based on: the set of predicted quality scores; the set of estimated costs; amounts of token reduction characterizing the set of candidate transforms; and the objective function.

For example, for each language model in the set of language models, the system can: access a predicted quality score, in the set of predicted quality scores, (and/or an adjusted quality score) of the projected response by the language model; access an estimated cost, in the set of estimated costs, (and/or an adjusted estimated cost) for the projected response by the language model; calculate a cost score based on (e.g., inversely proportional to) the estimated cost (and/or the adjusted estimated cost) for the projected response by the language model; access an estimated response time, in the set of estimated response times, for the projected response by the language model; and calculate a response time score based on (e.g., inversely proportional to) the estimated response time for the projected response by the language model.

In this example, for each language model in the set of language models, the system can calculate an aggregate score, in a set of aggregate scores, for the language model based on: the predicted quality score (and/or the adjusted quality score) of the projected response by the language model according to the first weight; the cost score according to the second weight; and the response time score according to the third weight.

The system can then select the target language model, in the set of language models, characterized by a greatest aggregate score in the set of aggregate scores according to the objective function.

7. Target Prompt Generation

The method S100 includes: deriving a target combination of transforms in the set of candidate transforms based on the target language model in Block S140; and generating a target prompt based on the user query and the target combination of transforms, the target prompt characterized by a final quantity of tokens falling below the initial quantity of tokens in Block S142.

Generally, in Blocks S140 and S142, the system can: derive (or access) a target combination of transforms, in the set of candidate transforms, associated with the target language model; and generate a target prompt based on the user query and the target combination of transforms.

In one implementation, for each language model in the set of language models, the system executes the foregoing methods and techniques to derive a combination (or permutation) of transforms, in the set of candidate transforms, compatible with the language model and conforming to the set of constraints in Block S140.

In response to selecting the target language model, the system: accesses a target combination of transforms associated with the target language model; and generates a target prompt based on the user prompt and the target combination of transforms.

For example, in response to selecting the first language model for the user query, the system can: access the first permutation of transforms compatible with the first language model; and generate the target prompt by sequentially transforming the user query into the target prompt according to the first permutation of transforms.

In this example, the system can generate the target prompt characterized by a final quantity of input tokens (e.g., 12,000 tokens) falling below the initial quantity of input tokens (e.g., 16,000) in the user query.

Therefore, the system can transform the user query into a target prompt—characterized by a final quantity of tokens falling below the initial quantity of tokens in the user query—for submission to the target language model, thereby reducing a token count of the user query, reducing total resource allocation attributed to the user query, and/or simplifying the user query in order to potentially improve accuracy of a response generated according to the target prompt.

8. Output+Reporting

Block S144 of the method S100 recites generating an output specifying: the target language model; and the target prompt.

Generally, in Block S144, the system can generate an output specifying the target language model and/or the target prompt for submission (or dispatch) to the target language model.

In one implementation, in Block S146, the system generates a visualization (e.g., a report) specifying: an identifier of the target language model; a predicted quality score, in the set of predicted quality scores, associated with the target language model; and/or a resource estimate, in the set of resource estimates, associated with the target language model.

More specifically, the system can generate the visualization specifying: the predicted quality score (or an adjusted quality score) of a projected response by the target language model; an estimated cost, in the set of estimated costs, (or an adjusted estimated cost) for the projected response by the target language model; and an estimated response time, in the set of estimated response times, for the projected response by the target language model.

Additionally, the system can generate the visualization specifying: identifiers of other language models in the set of language models; predicted quality scores, in the set of predicted quality scores, (or adjusted quality scores) associated with the other language models; estimated costs, in the set of estimated costs, (or adjusted estimated costs) associated with the other language models; and estimated response times, in the set of estimated response times, associated with the other language models.

In this implementation, in Block S148, the system serves the visualization to a user, such as via a user interface.

Therefore, the system enables a user: to view predicted quality scores, estimated costs, and estimated response times of projected responses by the set of language models; and to confirm the target language model (or another language model) for submission of the user query.

9. Variation: Structured Data Schema+Processing

In one variation, the system accesses (e.g., via a first application programming interface, generates) a set of structured input data representing: the set of predicted quality scores; the set of estimated costs; and the set of candidate optimizations.

For example, for each language model in the set of language models, the system can generate the set of structured input data representing: the predicted quality score of the projected response by the language model; the initial quantity of input tokens in the user query; the estimated quantity of output tokens in the projected response by the language model; and the estimated cost for the projected response by the language model; etc.

In this example, for each candidate optimization in the set of candidate optimizations, the system can generate the set of structured input data representing: an identifier of the candidate optimization; an amount of token reduction associated with the candidate optimization; a quality impact score associated with the candidate optimization; and identifiers of language models, in the set of language models, with which the candidate optimization is compatible; etc.

In this variation, based on the set of structured input data, the system generates a set of structured output data representing: an identifier of the target language model for the user query; a target permutation of transforms associated with the target language model; the target prompt; and a set of performance characteristics (e.g., performance guarantees, budget compliance, quality retention) associated with a projected response by the language model for the user query.

For example, the system can generate the set of structured output data based on the set of structured input data by implementing: linear programming optimization according to a constraint relaxation technique; integer linear programming according to a brand-and-bound algorithm; an heuristic algorithm according to a greedy optimization technique and/or a genetic optimization technique; a satisfiability solving algorithm according to constraint propagation; a mixed integer programming algorithm based on cutting planes; a dynamic programming algorithm according to a memoization technique; and/or a machine learning model trained for query assignment prediction.

10. Language Model Invocation

The method S100 includes: invoking the target language model to generate a response for the user query according to the target prompt in Block S150; and serving the response to a user in Block S152.

Generally, in Blocks S150 and S152, the system can: dispatch the target prompt to the target language model; and return a response from the target language model to the user.

In one implementation, the system executes the foregoing methods and techniques: to select the target language model in the set of language models; and to generate the target prompt based on the user query and the target language model.

In this implementation, the system: invokes the target language model to generate a response for the user query according to the target prompt in Block S150; and serves the response to the user in Block S152.

More specifically, the system can invoke the target language model to generate the response for the user query absent invocations to other language models, in the set of language models, for the user query.

In one example, the system invokes the target language model to generate the response for the user query according to the target prompt in response to receiving confirmation of the target language model from the user.

In another example, the system autonomously invokes the target language model to generate the response for the user query according to the target prompt in response to selecting the target language model.

Therefore, rather than invoking every language model for responses to the user query, the system can: predict (or estimate) a quality, a cost, and a response time of a projected response from each language model; select the target language model predicted to generate a response characterized by highest (or relatively high) quality, lowest (or relatively low) cost, and/or shortest (or relatively short) response time for the user query; and selectively (e.g., exclusively) invoke the target language model for the user query, thereby increasing effectiveness of the user query while enabling the user to manage costs attributed to the user query or a set of queries.

11. Variation: Model Training Based on Optimized Reference Queries

In one variation, the system executes the foregoing methods and techniques: to access a first reference query, in a set of reference queries, representing a first software development task; and to access a first reference response, in a set of reference responses, corresponding to the first reference query. The first reference query is characterized by a first quantity of tokens.

In this variation, for the first language model, the system executes similar methods and techniques described above: to derive a first combination of transforms that is compatible with the first language model and that reduces the first quantity of tokens; and to generate a first transformed reference query based on the first reference query and the first combination of transforms. The first transformed reference query is characterized by a second quantity of tokens falling below the first quantity of tokens.

In this variation, the system executes the foregoing methods and techniques: to invoke the first language model to generate a first test response according to the first reference query; to calculate a first set of differences between the first test response and the first reference response; and to calculate a first test quality score—in a first subset of test quality scores in a first set of test quality scores for the first language model—based on the first set of differences.

Additionally, the system repeats the foregoing methods and techniques: to invoke the first language model to generate a second test response according to the first transformed reference query; to calculate a second set of differences between the second test response and the first reference response; and to calculate a second test quality score—in a second subset of test quality scores in the first set of test quality scores—based on the second set of differences.

The system repeats the foregoing methods and techniques for each reference query in the set of reference queries: to derive a combination of transforms that is compatible with the first language model and that reduces a quantity of tokens in the reference query; to generate a transformed reference query based on the reference query and the combination of transforms; to invoke the first language model to generate a test response according to the reference query; to calculate a test quality score—in the first subset of test quality scores—based on a set of differences between the test response and a reference response corresponding to the reference query; to invoke the first language model to generate an additional test response according to the transformed reference query; and to calculate an additional test quality score—in the second subset of test quality scores—based on a set of differences between the additional test response and the reference response.

In this variation, the system trains the quality prediction model to predict quality scores of responses by the first language model based on: the first subset of test quality scores according to a first weight; and the second subset of test quality scores according to a second weight (e.g., the second weight falling below the first weight).

The system repeats the foregoing methods and techniques for each language model in the set of language models.

12. Variation: Language Model Selection Based on Target Prompts

In another variation, as shown in FIG. 4, the system executes the foregoing methods and techniques: to access a user query characterized by an initial quantity of tokens in Block S122; to derive a set of candidate transforms for the user query in Block S124; and to access a quality prediction model that predicts quality scores of projected responses by the set of language models according to queries in Block S130. Each candidate transform in the set of candidate transforms is characterized by an amount of token reduction to the initial quantity of tokens.

For each language model in the set of language models, the system: derives a combination of transforms in the set of candidate transforms based on the language model in Block S140; generates a target prompt—characterized by a final quantity of tokens falling below the initial quality of tokens—in a set of target prompts based on the user query and the combination of transforms in Block S144; calculates a predicted quality score, in a set of predicted quality scores, of a projected response by the language model based on the target prompt and the quality prediction model in Block S132; and calculates a resource estimate (e.g., an estimated cost, an estimated response time), in a set of resource estimates, for the projected response by the language model based on the final quantity of tokens in the target prompt, an estimated quantity of tokens in the projected response, and token costs (e.g., an input token cost, an output token cost) associated with the language model in Block S134.

In this variation, in Block S136, the system selects a target language model, in the set of language models, for the user query based on: the set of predicted quality scores; and the set of resource estimates.

For example, for each language model in the set of language models, the system can: calculate an aggregate score, in a set of aggregate scores, of the language model based on: the predicted quality score of the projected response by the language model; and the resource estimate for the projected response by the language model.

In this example, the system can select the target language model, in the set of language models, characterized by a greatest aggregate score in the set of aggregate scores.

In this variation, the system executes the foregoing methods and techniques: to invoke the target language model to generate a response for the user query according to a target prompt, in the set of target prompts, associated with the target language model in Block S150; and serve the response to a user in Block S152.

Therefore, rather than calculating an adjusted quality score and/or an adjusted estimated cost associated with a response by a language model according to the user query, the system can (directly) calculate a predicted quality score of—and a resource estimate for—a response by each language model according to a target prompt associated with the user query.

13. Disclaimers

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:

accessing a user query characterized by an initial quantity of tokens;

deriving a set of candidate transforms for the user query by:

detecting a first set of language signals in the user query, the first set of language signals comprising a first subset of language signals characterized by a first quantity of tokens; and based on semantic alignment between the first subset of language signals and a second subset of language signals, deriving a first candidate transform, in the set of candidate transforms, for the first subset of language signals that yields the second subset of language signals characterized by a second quantity of tokens, each candidate transform in the set of candidate transforms characterized by an amount of token reduction to the initial quantity of tokens, the first candidate transform characterized by a first amount of token reduction corresponding to a difference between the first quantity of tokens and the second quantity of tokens;

accessing a quality prediction model that predicts quality scores of responses from a set of language models according to queries;

for each language model in the set of language models:

calculating a predicted quality score, in a set of predicted quality scores, of a projected response by the language model based on the user query and the quality prediction model; and calculating a resource estimate, in a set of resource estimates, for the projected response by the language model by calculating an estimated cost, in a set of estimated costs, for the projected response by the language model based on:

the initial quantity of tokens; and an estimated quantity of tokens in the projected response;

selecting a target language model, in the set of language models, for the user query based on:

the set of predicted quality scores;

the set of resource estimates comprising the set of estimated costs; and amounts of token reduction, characterizing the set of candidate transforms, comprising the first amount of token reduction;

deriving a target combination of transforms in the set of candidate transforms based on the target language model;

generating a target prompt based on the user query and the target combination of transforms, the target prompt characterized by a final quantity of tokens falling below the initial quantity of tokens; and generating an output specifying:

the target language model; and the target prompt.

2. The method of claim 1, further comprising:

accessing a first reference query, in a set of reference queries, representing a first software development task;

accessing a first reference response in a set of reference responses, the first reference response:

corresponding to the first reference query; and comprising a set of reference program code that resolves the first software development task;

for a first language model in the set of language models:

invoking the first language model to generate a first test response based on the first reference query;

calculating a first set of differences between the first test response and the first reference response; and calculating a first test quality score, in a first set of test quality scores for the first language model, based on the first set of differences; and training the quality prediction model to predict quality scores of responses by the first language model based on the set of reference queries and the first set of test quality scores.

3. The method of claim 2:

wherein accessing the first reference response comprises accessing the first reference response comprising the reference set of program code characterized by a first quantity of tokens;

wherein invoking the first language model to generate the first test response comprises invoking the first language model to generate the first test response comprising a first set of program code characterized by a second quantity of tokens; and wherein calculating the first test quality score comprises calculating the first test quality score based on:

a difference between the first quantity of tokens and the second quantity of tokens; and a confidence that the first set of program code resolves the first software development task.

4. The method of claim 2:

wherein accessing the first reference query comprises:

accessing the first reference query characterized by a first quantity of tokens;

deriving a first combination of transforms, for the first reference query, that reduces the first quantity of tokens; and generating a first transformed reference query based on the first reference query and the first combination of transforms, the first transformed reference query characterized by a second quantity of tokens falling below the first quantity of tokens;

wherein invoking the first language model to generate the first test response based on the first reference query comprises:

invoking the first language model to generate the first test response according to the first reference query; and invoking the first language model to generate a second test response according to the first transformed reference query;

further comprising calculating a second set of differences between the second test response and the first reference response;

wherein calculating the first test quality score comprises:

calculating the first test quality score, in a first subset of test quality scores in the first set of test quality scores, based on the first set of differences; and calculating a second test quality score, in a second subset of test quality scores in the first set of test quality scores, based on the second set of differences; and wherein training the quality prediction model comprises training the quality prediction model to predict quality scores of responses by the first language model based on:

the first subset of test quality scores according to a first weight; and the second subset of test quality scores according to a second weight falling below the first weight.

5. The method of claim 2:

further comprising, for a second language model in the set of language models:

invoking the second language model to generate a second test response based on the first reference query;

calculating a second set of differences between the first test response and the first reference response; and calculating a second test quality score, in a second set of test quality scores for the second language model, based on the second set of differences; and wherein training the quality prediction model comprises training the quality prediction model to predict quality scores of responses by the second language model based on the set of reference queries and the second set of test quality scores.

6. The method of claim 1:

wherein deriving the first candidate transform comprises:

calculating a first context score representing semantic alignment between the first subset of language signals and the second subset of language signals; and in response to the first context score exceeding a context score threshold, deriving the first candidate transform for the first subset of language signals that yields the second subset of language signals.

7. The method of claim 1:

wherein deriving the first candidate transform comprises:

calculating a first quality impact score representing reduction of predicted quality of the projected response based on replacement of the first subset of language signals with the second subset of language signals; and in response to the first quality impact score falling below a threshold quality impact score, deriving the first candidate transform for the first subset of language signals that yields the second subset of language signals.

8. The method of claim 1:

further comprising:

accessing a policy defining:

a threshold quality score;

a threshold cost; and a threshold response time;

wherein calculating the resource estimate for the projected response for each language model comprises:

calculating an estimated response time, in a set of estimated response times, for the projected response by the language model based on the user query; and wherein selecting the target language model for the user query comprises selecting a first language model in the set of language models for the user query based on:

a first predicted quality score, in the set of predicted quality scores, associated with the first language model and exceeding the threshold quality score;

a first estimated cost, in the set of estimated costs, associated with the first language model and falling below the threshold cost; and a first estimated response time, in the set of estimated response times, associated with the first language model and falling below the threshold response time.

9. The method of claim 8, wherein selecting the target language model for the user query comprises:

for each language model in the set of language models, calculating an aggregate score, in a set of aggregate scores, of the language model based on:

the predicted quality score of the projected response by the language model;

the resource estimate for the projected response by the language model; and the estimated response time for the projected response by the language model; and selecting the target language model characterized by a greatest aggregate score in the set of aggregate scores.

10. The method of claim 8:

wherein selecting the target language model for the user query comprises:

accessing an objective function representing:

a first weight for predicted quality scores in the set of predicted quality scores;

a second weight for estimated costs in the set of estimated costs; and a third weight for estimated response times in the set of estimated response times; and selecting the target language model for the user query based on:

the set of predicted quality scores;

the set of estimated costs;

amounts of token reduction characterizing the set of candidate transforms; and the objective function.

11. The method of claim 1:

wherein deriving the target combination of transforms comprises deriving a target permutation of transforms, in the set of candidate transforms, compatible with the target language model; and wherein generating the target prompt comprises generating the target prompt by sequentially transforming the user query into the target prompt according to the target permutation of transforms.

12. The method of claim 1, wherein generating the output comprises:

generating a visualization specifying:

an identifier of the target language model;

the target prompt;

a predicted quality score, in the set of predicted quality scores, associated with the target language model; and a resource estimate, in the set of resource estimates, associated with the target language model; and serving the visualization to a user.

13. The method of claim 1, wherein generating the output comprises:

invoking the target language model to generate a response for the user query according to the target prompt; and serving the response to a user.

14. The method of claim 13:

wherein invoking the target language model comprises exclusively invoking the target language model to generate the response for the user query absent invocations to other language models, in the set of language models, for the user query.

15. A method comprising:

accessing a set of reference queries representing software development tasks;

accessing a set of reference responses corresponding to the set of reference queries;

for each language model in the set of language models:

for each reference query in the set of reference queries:

invoking the language model to generate a test response based on the reference query;

calculating a set of differences between the test response and a reference response, in the set of reference responses, corresponding to the reference query; and calculating a test quality score, in a set of test quality scores for the language model, based on the set of differences; and based on the set of reference queries and the set of test quality scores, training a quality prediction model to predict quality scores of projected responses by the language model according to queries;

accessing a user query representing a software development task;

for each language model in the set of language models:

calculating a predicted quality score, in a set of predicted quality scores, of a projected response by the language model based on the user query and the quality prediction model; and calculating a resource estimate, in a set of resource estimates, for the projected response by the language model;

selecting a target language model, in the set of language models, for the user query based on:

the set of predicted quality scores; and the set of resource estimates;

generating a visualization specifying:

an identifier of the target language model;

a predicted quality score, in the set of predicated quality scores, associated with the target language model; and a resource estimate, in the set of resource estimates, associated with the target language model; and serving the visualization to a user.

16. The method of claim 15:

wherein accessing the user query comprises accessing the user query characterized by an initial quantity of tokens;

further comprising deriving a set of candidate transforms for the user query, each candidate transform in the set of candidate transforms characterized by an amount of token reduction to the initial quantity of tokens; and wherein selecting the target language model for the user query comprises selecting the target language model for the user query based on:

the set of predicted quality scores;

the set of resource estimates; and amounts of token reduction characterizing the set of candidate transforms.

17. The method of claim 16, further comprising:

deriving a combination of transforms, in the set of transforms, compatible with the target language model;

generating a target prompt based on the user query and the combination of transforms;

in response to confirmation of the target language model from the user, invoking the target model to generate a response for the user query according to the target prompt; and serving the response to a user.

18. A method comprising:

accessing a first reference query, in a set of reference queries, representing a first software development task;

accessing a first reference response in a set of reference responses, the first reference response:

corresponding to the first reference query; and comprising a set of reference program code that resolves the first software development task;

for a first language model in a set of language models:

invoking the first language model to generate a first test response based on the first reference query;

calculating a first set of differences between the first test response and the first reference response; and calculating a first test quality score, in a first set of test quality scores for the first language model, based on the first set of differences;

training a quality prediction model to predict quality scores of responses by the first language model based on the set of reference queries and the first set of test quality scores;

accessing a user query characterized by an initial quantity of tokens;

deriving a set of candidate transforms for the user query, each candidate transform in the set of candidate transforms characterized by an amount of token reduction to the initial quantity of tokens;

accessing the quality prediction model that predicts quality scores of responses from the set of language models according to queries;

for each language model in the set of language models:

calculating a predicted quality score, in a set of predicted quality scores, of a projected response by the language model based on the user query and the quality prediction model; and calculating a resource estimate, in a set of resource estimates, for the projected response by the language model;

selecting a target language model, in the set of language models, for the user query based on:

the set of predicted quality scores;

the set of resource estimates; and amounts of token reduction characterizing the set of candidate transforms;

deriving a target combination of transforms in the set of candidate transforms based on the target language model;

generating a target prompt based on the user query and the target combination of transforms, the target prompt characterized by a final quantity of tokens falling below the initial quantity of tokens; and generating an output specifying:

the target language model; and the target prompt.

19. A method comprising:

accessing a policy defining:

a threshold quality score;

a threshold cost; and a threshold response time;

accessing a user query characterized by an initial quantity of tokens;

deriving a set of candidate transforms for the user query, each candidate transform in the set of candidate transforms characterized by an amount of token reduction to the initial quantity of tokens;

accessing a quality prediction model that predicts quality scores of responses from a set of language models according to queries;

for each language model in the set of language models:

calculating a predicted quality score, in a set of predicted quality scores, of a projected response by the language model based on the user query and the quality prediction model; and calculating a resource estimate, in a set of resource estimates, for the projected response by the language model by:

calculating an estimated cost, in a set of estimated costs, for the projected response by the language model based on the user query; and calculating an estimated response time, in a set of estimated response times, for the projected response by the language model based on the user query;

selecting a first language model, in the set of language models, for the user query based on:

a first predicted quality score, in the set of predicted quality scores, associated with the first language model and exceeding the threshold quality score;

a first estimated cost, in the set of estimated costs, associated with the first language model and falling below the threshold cost;

a first estimated response time, in the set of estimated response times, associated with the first language model and falling below the threshold response time; and amounts of token reduction characterizing the set of candidate transforms;

deriving a target combination of transforms in the set of candidate transforms based on the first language model;

generating a target prompt based on the user query and the target combination of transforms, the target prompt characterized by a final quantity of tokens falling below the initial quantity of tokens; and generating an output specifying:

the first language model; and the target prompt.

* * * * *